Sept. 6, 1966 T. P. HARPER 3,271,515

ELECTRONIC HANDWRITING DETECTION AND DISPLAY APPARATUS

Filed Jan. 28, 1963 2 Sheets-Sheet 1

INVENTOR.
THOMAS P. HARPER
BY
John J. McCormack
ATTORNEY 3,271,515
Patented Sept. 6, 1966

3,271,515

ELECTRONIC HANDWRITING DETECTION AND DISPLAY APPARATUS

Thomas P. Harper, San Jose, Calif., assignor to International Business Machines Corporation, New York, N.Y., a corporation of New York Filed Jan. 28, 1963, Ser. No. 254,150
4 Claims. (Cl. 178—6.8)

This invention relates to electronic writing systems, and more particularly, to systems for electronically generating storing and transmitting handwritten light images to remote receiving display while simultaneously displaying it upon the generating unit.

Workers in the data transmission arts have long endeavored to provide a simple system for the electronic generation of handwritten information and the simple transmission thereof to display receivers, both remote and on location. The present invention performs this function without any of the special equipment required in the prior art. The present invention provides a system for the display, storage and transmission of patterns through the inventive arrangement of conventional cathode ray tubes, photo-detectors, delay means and amplification means.

Prior art attempts to generate a practical, visible display of handwritten information have involved special, complex and expensive equipment such as customized cathode ray tubes with separate tubes to generate and to receive the information and requiring a plurality of transmission channels to transmit the information. The present invention dispenses with such expensive display generation means using a conventional cathode ray tube, and further, uses the same tube to generate and to receive the display. It also provides for single-channel transmission of the display information.

A further disadvantage of prior art systems has been the fact that, in addition to providing cumbersome and complex display equipment, they have provided no practical and simple means of storing the video information. The present invention resolves this inadequacy by providing such simple storage means for the video information.

Another disadvantage of prior art handwriting display systems has been that they require separate video image generation equipment which necessitates a separate light source, a light detector separate from said source, and complex detection equipment. The present invention offers a means for generating a visible display, using the display surface as its own source of video energy and requiring merely a conventional photo-detector means for the detection thereof. The simplicity of using the display means to generate its own video pattern and, conversely, using the video generation means as its own display is self evident.

A specific embodiment of the invention as described and illustrated herein involves using a conventional cathode tube as the display source and writing surface with remote cathode tube display units; however, the invention may be practiced with other display-writing means having discrete display units across a display matrix surface, the intensity of which may be controlled by the writing instrument.

Hence, it is an object of this invention to provide video display generating means using a conventional cathode ray tube.

Yet another object is to provide video display and transmission means using conventional cathode ray tubes for both the generation and the display of the video information.

Still another object of the invention is to provide a video writing system using conventional cathode ray tubes for the generation and the remote display of the video information.

Still another object is to provide a video writing system using simple conventional components for the generation, the storage, the display and the transmission of the video information.

Another object is to provide a video writing system using the display means as the source of the video information.

Yet another object is to provide a video writing and display system requiring only a cathode ray beam intensity modifier as the writing signal gate.

Still another object is to provide a video writing system whereby handwritten information may be generated, stored and displayed by the mere use of a photo-detector placed upon the surface of a cathode ray tube, the scan-beam of which is of uniform intensity and adjustable.

The foregoing and other objects, features and advantages of the invention will become more apparent in the following more particular description of a preferred embodiment of the invention, as illustrated in the accompanying drawings wherein.

Figure 1:
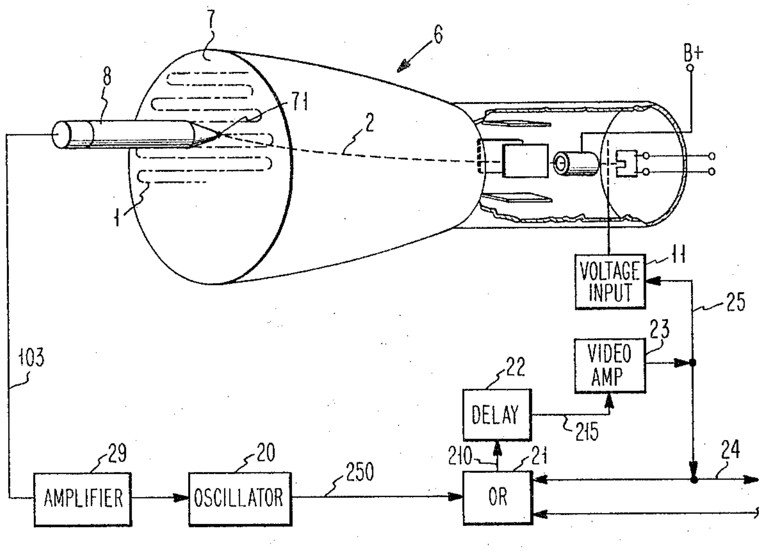
FIG. 1 is a block diagram of a practical embodiment of the invention.

In schematic block diagram form, FIG. 1 illustrates how the invention may be practiced with a conventional cathode ray tube 6 in combination with a photo-detector fixed in a light pen 8. Pen 8 serves as the display-generating means in detecting the light energy from scanning beam 2 at point 71 on the CRT screen 7. Screen 7 serves as the writing surface and is coated with a fast phosphor for quick illumination-quenching time. In this embodiment, surface 7 is scanned by the cathode ray beam 2 in a conventional CRT scan configuration 1 of barely visible intensity. The total time required for the electron beam to accomplish one complete raster scan of the entire display face of the CRT will be referred to hereinafter as $T_s$. Pen 8 "writes" a pattern on the screen 7 by unblanking or intensifying the luminance of spot 71 at the writing spot. This is effected through dropping grid voltage input 11 at the corresponding time in scan cycle $T_s$. However, alternatively, the system would be able to write in a negative fashion by maintaining the intensity of trace 1 at high intensity level except where written upon by the pen 8, at which point the spot would consist of a blanking or decreased intensity. When the point of pen 8 is brought into contact with CRT screen 7, a pulse will be generated by the photo-detector means therein and presented to amplifier 29 and thence to blocking oscillator 20. Oscillator 20 has a recovery period sufficient to generate at least one pulse per scan and may be triggered to generate an amplitude-normalized signal with a normalized period. This signal pulse will be fed into the delay line means 22 through signal-isolating "OR" gate 21 at some period of time $T_p$, representing the scan time to the point of writing $T_{sp}$ plus a short process time $T_t$. The delayed pulse is then amplified by video amplifier 23 having .5–20 mc. bandpass characteristics. The amplified pulse from video amplifier 23 is then re-entered into the delay line 22 for recirculation (i.e., storage). Delay 22 may have a period of about 2 milliseconds. The signal is simultaneously presented to remote lines 24 and to the grid blanking means 11 of the cathode ray tube so that it may unblank or brighten the CRT beam and cause a visible spot to appear at the writing position. In this manner, as the pen 8 is moved across the CRT surface 7, this amplification and storage process would be repeated and, thus, a train of pulses will result, representing the pattern traced by the pen 8 on the CRT face 7 by the "writer" holding the pen. This train of pulses can be stored and, when desired, transferred to identical CRT receiving units by merely connecting the video amplifier output to the input line 24 of the remote set. This can be done through a length of co-axial cable or a twisted pair. Thus, the display system may present this video pattern to any number of plural remote units. Likewise, any particular remote unit may receive from a plurality of sending stations. This arrangement of delay means 22, amplifier 23 and "OR" gate 21 is such as to allow the display-signal pulse train to recirculate indefinitely and thus be automatically stored.

Figure 2:
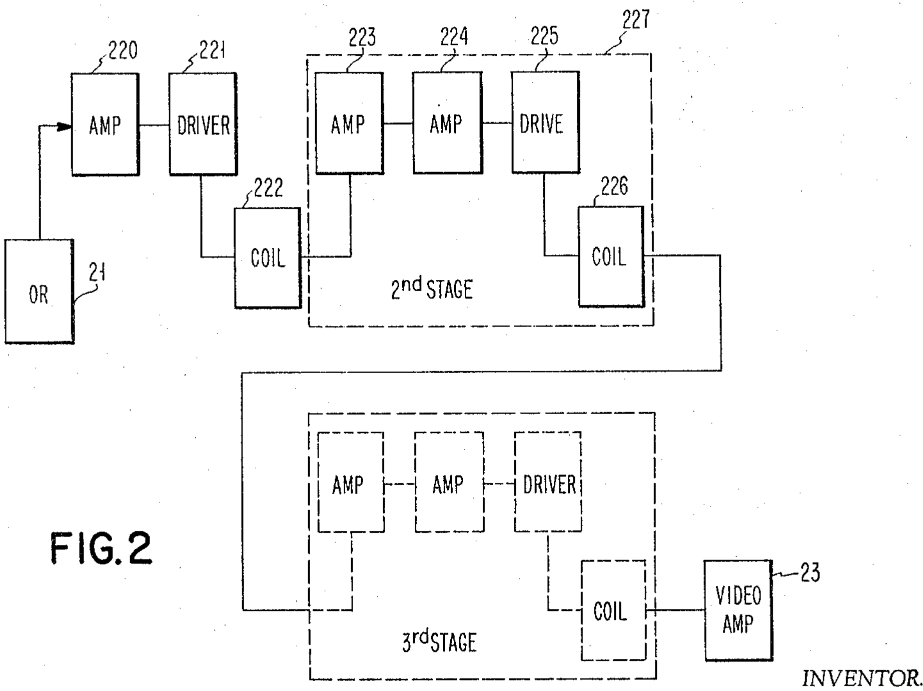
FIG. 2 is a block diagram of the delay means shown in FIG. 1.
Figure 3:
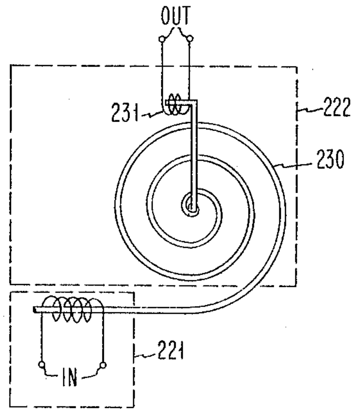
FIG. 3 is an illustration of a preferred delay means used in the combination of FIG. 2.
Figure 5:
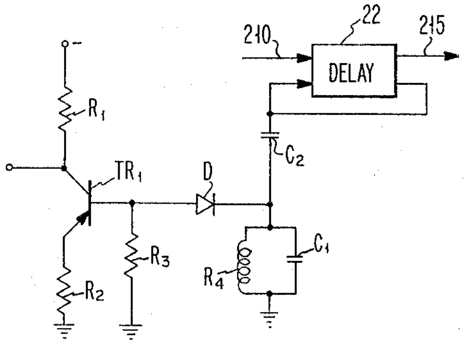
FIG. 5 is a schematic circuit of alternative delay synchronization means for the combination of FIG. 1.

FIG. 2 shows in block diagram form the details of delay means 22 in FIG. 1. The signal is presented to the delay combination from the OR gate 21. The delay means in this embodiment comprises a magneto-strictive coil delay which is driven by a magnetic transducer and is more particularly shown in FIG. 3. The delay means accepts the input signal at trigger amplifier means 220 which normalizes the amplitude for the driver means 221 associated with coil 222. This drive means 221 serves as the coil-actuating transducer (cf. FIG. 3) and generally comprises a coil means arranged to magneti-strictively distort the coil 230 in FIG. 3. The power (ampere-turns) of this drive means is tuned to the distortion properties of delay coil 230 and may be made adjustable. The coil delay combination 222, one energized, will mechanically pass the magneto-strictive distortion induced by driver 221 down the length of coil 230 to appear at the output transducer 231 after a constant prescribed delay time $T_c$. This time during which the pulse passes along the length of coil 230 from input means 221 to the output transducer 231 is a constant specified time $T_c$ which, in this particular embodiment, is made exactly equal to the scan time $T_s$. Scan time $T_s$, being more readily adjustable, may be adjusted to exactly equal $T_c$ in this case. In this way, when successive distortions are induced by drive means 221 onto the coil 230, representing successive timed writing spots upon CRT detected by the pen 8, they will always be in synchronism with the CRT scan time $T_s$. It will be recognized that when the scan period $T_s$ is adjusted to exactly coincide with the coil period $T_c$, a convenient means of automatic synchronization is effected. As an alternative to this synchronization concept, the synchronizing circuit shown in FIG. 5 may be used with a delay magneto-strictive coil having a period $T_c$ which is greater than scan time $T_s$. In addition to the synchronization circuit shown in FIG. 5, it may also be convenient to synchronize the delay means with the scan time through crystal-controlled oscillator means conventionally used by workers in the art.

Figure 4:
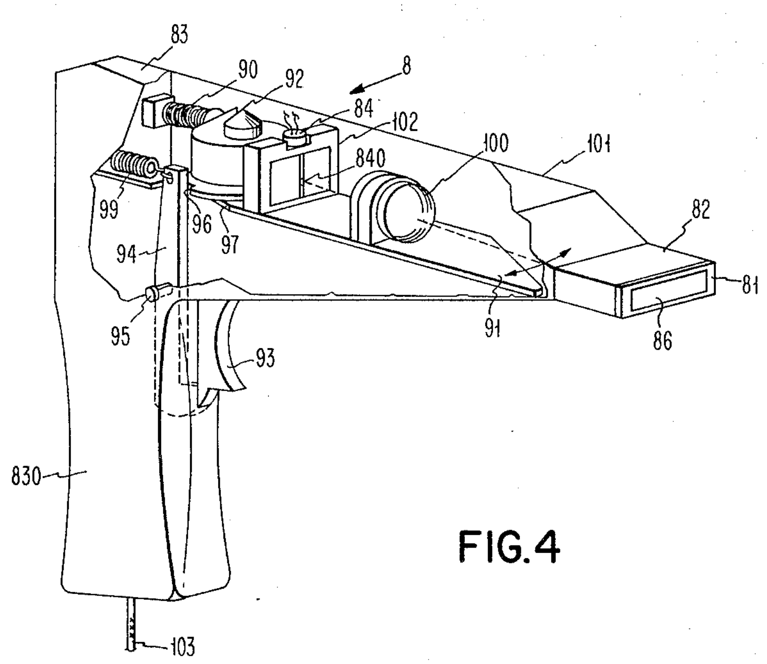
FIG. 4 is a perspective view, partly broken away and in section of the light-gun used with the invention.

The details of the writing pen 8 are shown in FIG. 4 in a cutaway perspective form. This pen 8 has a gun configuration using a casing 83 which takes the form of a handle portion 830 and a barrel portion 101 in which is mounted the photodetector. This photodetector 84 may be any suitable photosensing means such as a photoconductor, photovoltaic means such as a photocell or diode or a phototransistor such as transistor 84 shown in the drawing. Phototransistor 84 is a planar phototransistor which comprises essentially a transistor with an aperture 840 cut thereinto for photo-modifying its conductance, as is well known to those skilled in the art. Focusing lens 100 serves to focuse the input light energy accepted at the aperture 86 upon the inset 840 cut into the transistor. It has been found that a suitable transistor-lens arrangement is one having a 10° cone of acceptance. The light after passing through aperture 86 traverses a collimating portion 82 whereby stray ambient light unconnected with the luminescent spot at the writing point may be eliminated. Mask 81 also serves to eliminate such stray light and comprises any suitable resilient padding such as a rubber pad which may be pressed against the screen to mask-out surrounding "light noise." Mounting means 91 is provided within the barrel 101 to adjust the position of lens 100, while adjuster 90 serves essentially the same purpose for positioning the transistor 84. Mounting block 92 on which is mounted the transistor housing 102 houses the transistor power supply as well as the on-off switch. This on-off switch is activated by the operator through trigger 93 and linkage 94 adapted to pivot about shaft 95 and connect the switching terminals 96–97 when so pivoted. Light pen 8 need not take this form necessarily, but may take any suitable form which will make it convenient to manipulate by the operator. Cable 103 preceding from the light pen 8 serves to conduct the transistor-generated writing signal to the display generation means.

The instant video writing system provides a method of instantaneously routing handwritten electronic memos at a reasonable cost. The writer is not restricted by cumbersome and complex writing equipment such as pantographic devices or the like. Existing magnetic devices are capable of storing the pulse train to provide a permanent record of all handwritten information that passes through the system. The output of the delay line is suitable for driving an electrostatic printer, thus providing for hard copy output without special paper.

While the particular embodiment described above represents a useful application of the inventive video writing system, using a cathode ray tube and a photocell pen-sensor, such usage does not exhaust its potential. In the broad sense, the inventive combination is a system for generating and transmitting a visible pattern upon a writing surface comprising a matrix of variable intensity, luminescent cells. Such a writing surface need not be the phosphor screen of a cathode ray tube, but may be modified to comprise an electroluminescent matrix or the like. Similarly, the sensor means need not necessarily be a phototransistor, as described, but may for instance, be another type of optical transducer such as a photoresistor.

The applications of the invention are not limited to pattern-generation alone, but may include pattern-matching uses; for instance, the automatic comparison of a pattern by a CRT beam representing raw input data, with an idealized pattern, represented by a stencil superimposed over the CRT screen. In this way, pattern variances from the ideal would be automatically generated and could be recorded. Such pattern could comprise engineering curves, typed information, print-out from a Data Processing Unit and the like. Curve-approximation and computer print-out problems could be conveniently met in this way.

While there have been described above and shown in the drawings various system and methods for analyzing wave forms, and thereby generating video display in accordance with the invention, it is apparent that the various elements and steps may be modified or completely supplanted by the use or substitution of other known elements or arrangements of components. Accordingly, the invention should be considered to include all modifications, variations and alternative forms falling within the scope of the appended claims.

I claim:

1. An electronic video writing and transmitting system comprising:

a writing surface means, said writing surface means comprising a display surface having separate luminescent cells of uniformly adjustable intensity, distributed homogenously thereacross, the intensity of said cells being uniform in the unwritten state, and having cell-intensity modifying means;

a manually manipulatable photodetector means adapted to generate a "write-pulse" whenever superposed upon said cells in "writing position" in response to the light energy of said cells; and pulse synchronization means connected between said photodetector and the input of said adjustable cell intensity modifying means whereby said pulse may "write" by causing a change in the intensity of the cell over which it is superposed, said pulse synchronization means comprising:

magneto-strictive delay means, including a magneto-strictive delay coil, the input of which includes drive means connected between said coil and said detector means; and amplification means connected between said coil and said modifying means and being arranged to modify the delayed pulse from said photodetector and present it to beam-gating means associated with said modifying means so as to increase the intensity of said cell at said writing position and thereby "write" a brightened spot upon said display surface.

2. An electronic video writing and transmitting system comprising:

a plurality of writing surface means, one of which comprises a writing station, the others being disposed at remote locations for remote display, each of said writing surface means comprising a similar display surface having separate luminescent cells of uniformly adjustable intensity, distributed homogenously thereacross, the intensity of said cells being uniform in the unwritten state, each of said writing surface means having similar-intensity modifying means and being arranged to scan said cells synchronously;

a manually manipulatable photodetector means adapted to generate a "write-pulse" whenever superposed upon said cells of said writing station in "writing position" in response to the light energy of said cells; and pulse synchronization means connected between said photodetector and the input of each of said adjustable cell intensity modifying means, whereby said pulse may "write" by causing a change in the intensity of the cell over which it is superposed and in the intensity of corresponding cells in each of said remote display stations thereby creating a plurality of light discontinuities comprising remote video display of a written pattern.

3. A facsimile system for generating and transmitting graphic information comprising:

a writing station including cathode ray tube means having a screen and beam intensity modifying means;

at least one remote station including a similar cathode ray tube means and having similar beam intensity modifying means;

a manually-operable photodetector adaptable to detect the presence of the cathode ray beam at discrete positions on said screen, said positions constituting "writing spots," and synchronization means connected to the output of said detector means in the input of each of said intensity modifying means and being arranged to synchronize the output signal from said detector means with the scan time of each of said cathode ray beams whereby the intensity thereof may be varied at said writing spots thereby displaying said facsimile pattern at said writing station and at said remote stations.

4. A facsimile system for generating and transmitting graphic information comprising:

cathode ray tube means having a screen and beam intensity modifying means;

a manually-operable photodetector adaptable to detect the presence of the cathode ray beam at discrete positions on said screen, said positions constituting "writing spots"; and synchronization means connected to the output of said detector means and the input of said intensity modifying means and being arranged to synchronize the output signal from said detector means with the scan time of said cathode ray beams whereby the intensity thereof may be varied at said writing spot, said synchronization means including magneto-strictive delay means and signal amplifying means connected in series, forming a loop, whereby the photodetector writing pulses may be recirculated and thus stored by said delay means.

References Cited by the Examiner

UNITED STATES PATENTS

| | | | |
|---|---|---|---|
| 2,474,628 | 6/1949 | Hurvitz | 315—9 |
| 2,487,651 | 11/1949 | Denk | 315—1 X |
| 2,640,901 | 6/1953 | Kinman | 250—227 |
| 2,648,060 | 8/1953 | Turner | 333—30 |
| 2,855,589 | 10/1958 | Baker et al. | 250—217 |
| 2,903,690 | 9/1959 | Slack | 250—227 |
| 3,037,192 | 5/1962 | Everett | 250—217 |

DAVID G. REDINBAUGH, *Primary Examiner.*

T. G. KEOUGH, J. A. ORSINO, *Assistant Examiners.*